US009867168B2

(12) United States Patent
Drucker

(10) Patent No.: US 9,867,168 B2
(45) Date of Patent: Jan. 9, 2018

(54) HYBRID FDD/TDD WIRELESS NETWORK

(71) Applicant: Empire Technology Development LLC, Wilmington (DE)

(72) Inventor: Elliott H. Drucker, Kirkland, WA (US)

(73) Assignee: EMPIRE TECHNOLOGY DEVELOPMENT LLC, Wilmington, DE (US)

(*) Notice: Subject to any disclaimer, the term of this patent is extended or adjusted under 35 U.S.C. 154(b) by 42 days.

(21) Appl. No.: 14/783,309

(22) PCT Filed: Apr. 30, 2013

(86) PCT No.: PCT/US2013/038899
§ 371 (c)(1),
(2) Date: Oct. 8, 2015

(87) PCT Pub. No.: WO2014/178852
PCT Pub. Date: Nov. 6, 2014

(65) Prior Publication Data
US 2016/0057746 A1 Feb. 25, 2016

(51) Int. Cl.
*H04J 3/00* (2006.01)
*H04W 72/04* (2009.01)
*H04B 7/26* (2006.01)
*H04L 5/14* (2006.01)

(52) U.S. Cl.
CPC ...... *H04W 72/0413* (2013.01); *H04B 7/2615* (2013.01); *H04L 5/14* (2013.01); *H04W 72/044* (2013.01)

(58) Field of Classification Search
CPC ............ H04W 72/0413; H04W 72/044; H04B 7/2615; H04L 5/14
See application file for complete search history.

(56) References Cited

U.S. PATENT DOCUMENTS 7,706,308 B2    4/2010  Yun et al.
2007/0286156 A1*  12/2007  Gormley ............. H04B 7/2615
                                                    370/350

(Continued)

FOREIGN PATENT DOCUMENTS

EP        1259092 A2    11/2002
WO    2005088866 A1     9/2005

OTHER PUBLICATIONS

"Cisco Visual Networking Index: Global Mobile Data Traffic Forecast Update, 2012-2017," Visual Networking Index, accessed at http://web.archive.org/web/20130427043236/http://www.cisco.com/en/US/solutions/collateral/ns341/ns525/ns537/ns705/ns827/white_paper_c11-520862.html, Feb. 6, 2013, pp. 17.
"The Economic Benefits of New Spectrum for Wireless Broadband," Executive Office of the President—Council of Economic Advisors, pp. 1-21 (Feb. 2012).

(Continued)

*Primary Examiner* — Abdelnabi O Musa
(74) *Attorney, Agent, or Firm* — Brundidge & Stanger, P.C.

(57) ABSTRACT

Technologies and implementations for wireless communication in a wireless network including transmitting downlink information on a first frequency channel to Frequency Division Duplexing (FDD) User Equipments (UEs), transmitting downlink information on a second frequency channel during downlink portions of Time Domain Duplex (TDD) frame periods of the second frequency channel to TDD UEs, wherein the second frequency channel is the same as the frequency channel on which the FDD UEs are configured to transmit, and controlling uplink transmissions from the FDD UEs to occur only during uplink portions of TDD frame periods of the second frequency channel.

24 Claims, 6 Drawing Sheets

(56) References Cited

U.S. PATENT DOCUMENTS

| | | | |
|---|---|---|---|
| 2008/0119145 A1 | 5/2008 | Lee et al. | |
| 2012/0082038 A1* | 4/2012 | Xu | H04J 11/0023 370/244 |
| 2012/0195285 A1 | 8/2012 | Ko et al. | |
| 2012/0257552 A1* | 10/2012 | Chen | H04L 5/001 370/280 |
| 2013/0022095 A1 | 1/2013 | Pesola et al. | |
| 2014/0293893 A1* | 10/2014 | Papasakellariou | H04W 72/04 370/329 |

OTHER PUBLICATIONS

Bhalerao, R., "The Evolution of LTE TDD," EE Times, accessed at http://web.archive.org/web/20120526064339/http://www.eetimes.com/design/communications-design/4371992/The-Evolution-of-LTE-TDD, May 1, 2012, pp. 4.

Goldman, D., "Sorry, America: Your wireless airwaves are full," The Spectrum Crunch, CNN Money, accessed at https://web.archive.org/web/20130404031212/http://money.cnn.com/2012/02/21/technology/spectrum_crunch/index.htm, Feb. 21, 2012, pp. 2.

International Search Report for International Application No. PCT/US13/38899, dated Jul. 11, 2013.

Jing, T., et al., "Achievable transmission capacity of cognitive mesh networks with different media access control," Proceeding of IEEE INFOCOM, pp. 1764-1772 (Mar. 25-30, 2012).

Extended European Search Report for International Application No. 13883726.5, dated Nov. 17, 2016, pp. 7.

\* cited by examiner

600 A computer program product

602 A signal bearing medium

604 Machine-readable instructions that, when executed, operatively enable a node of a wireless network to:

transmit downlink information on a first frequency channel to one or more Frequency Domain Duplex (FDD) User Equipments (UEs);

transmit downlink information on a second frequency channel during downlink portions of Time Domain Duplex (TDD) frame periods of the second frequency channel to one or more TDD UEs, wherein the second frequency channel is the same frequency channel as the frequency channel on which the FDD UEs are configured to transmit; and control the uplink transmissions from the FDD UEs to occur only during uplink portions of TDD frame periods of the second frequency channel.

605 Machine-readable instructions that, when executed, operatively enable a node of a wireless network to:

receive uplink information on a first frequency channel from one or more Frequency Domain Duplex (FDD) User Equipments (UEs);

receive uplink information on a second frequency channel during uplink portions of Time Domain Duplex (TDD) frame periods of the second frequency channel from one or more TDD UEs, wherein the second frequency channel is the same frequency channel as the frequency channel on which the FDD UEs are configured to receive downlink transmissions; and transmit downlink information to the one or more FDD UEs on the second frequency channel only during downlink portions of TDD frame periods.

| 606 a computer-readable medium | 608 a recordable medium | 610 a communications medium |

Fig. 6

HYBRID FDD/TDD WIRELESS NETWORK

CROSS-REFERENCE TO RELATED APPLICATION

This Application is a U.S. National Stage filing under 35 U.S.C. §371 of International Application No. PCT/US2013/038899, filed on Apr. 30, 2013, the entire disclosure of which is incorporated herein by reference.

BACKGROUND

Unless otherwise indicated herein, the approaches described in this section are not prior art to the claims in this application and are not admitted to be prior art by inclusion in this section.

A hybrid Frequency Division Duplexing (FDD) and Time Division Duplexing (TDD) wireless network may provide wireless network capability for FDD devices, TDD devices, and/or hybrid FDD/TDD devices to enable shared connectivity on a wireless network. Traditional wireless networks may only support one of FDD or TDD. The hybrid FDD/TDD wireless network may be configured to enable backward compatibility so that legacy devices and newer hybrid FDD/TDD compatible devices may share network resources.

SUMMARY

In various embodiments, the present disclosure describes example methods for wireless communication in a wireless network. Example methods may include transmitting downlink information on a first frequency channel to one or more Frequency Domain Duplex (FDD) User Equipments (UEs). Example methods may include transmitting downlink information on a second frequency channel during downlink portions of Time Division Duplexing (TDD) frame periods of the second frequency channel to one or more TDD UEs, wherein the second frequency channel is the same frequency channel on which the one or more FDD UEs are configured to transmit. Example methods may include controlling the uplink transmissions from the one or more FDD UEs to occur only during the uplink portions of TDD frame periods.

In various embodiments, the present disclosure describes example methods for wireless communication in a wireless network. Example methods may include receiving uplink information on a first frequency channel from one or more Frequency Domain Duplex (FDD) User Equipments (UEs). Example methods may include receiving uplink information on a second frequency channel during uplink portions of Time Division Duplexing (TDD) frame periods of the second frequency channel from one or more TDD UEs, wherein the second frequency channel is the same frequency channel as the frequency channel on which the one or more FDD UEs are configured to receive downlink transmissions. Example methods may include transmitting downlink information to the one or more FDD UEs on the second frequency channel only during downlink portions of TDD frame periods.

In various embodiments, the present disclosure also describes an example apparatus for wireless communication. The example apparatus may include a transceiver module configured to connect to one or more antennas. The example apparatus may further include a wireless communication management module communicatively coupled to the transceiver module comprising a non-transitory signal bearing medium including instructions which, when executed, may transmit downlink information on a first frequency channel to one or more Frequency Domain Duplex (FDD) User Equipments (UEs). The example apparatus may further include instructions which, when executed, may transmit downlink information on a second frequency channel during downlink portions of Time Division Duplexing (TDD) frame periods of the second frequency channel to one or more TDD UEs, wherein the second frequency channel is the same frequency channel on which the one or more FDD UEs are configured to transmit. The example apparatus may further include instructions which, when executed, may control the uplink transmissions from the one or more FDD UEs to occur only during the uplink portions of TDD frame periods.

In various embodiments, the present disclosure also describes an example apparatus for wireless communication. The example apparatus may include a transceiver module configured to connect to one or more antennas. The example apparatus may further include a wireless communication management module communicatively coupled to the transceiver module comprising a non-transitory signal bearing medium including instructions which, when executed, may receive uplink information on a first frequency channel from one or more Frequency Domain Duplex (FDD) User Equipments (UEs). The example apparatus may further include instructions which, when executed, may receive uplink information on a second frequency channel during uplink portions of Time Division Duplexing (TDD) frame periods of the second frequency channel from one or more TDD UEs, wherein the second frequency channel is the same frequency channel as the frequency channel on which the one or more FDD UEs are configured to receive downlink transmissions. The example apparatus may further include instructions which, when executed, may control transmission of downlink information to the one or more FDD UEs on the second frequency channel to occur only during downlink portions of TDD frame periods.

In various embodiments, the present disclosure also describes an example article for wireless communication by a wireless communication management module. The example article may include a non-transitory signal bearing medium comprising machine-readable instructions stored thereon, which, when executed by one or more processors, operatively enable a node of a wireless network to operate as described herein. The example article may include instructions which, when executed, may transmit downlink information on a first frequency channel to one or more Frequency Domain Duplex (FDD) User Equipments (UEs). The example article may further include instructions which, when executed, may transmit downlink information on a second frequency channel during downlink portions of Time Division Duplexing (TDD) frame periods of the second frequency channel to one or more TDD UEs, wherein the second frequency channel is the same frequency channel on which the one or more FDD UEs are configured to transmit. The example article may further include instructions which, when executed, may control the uplink transmissions from the one or more FDD UEs to occur only during the uplink portions of TDD frame periods.

In various embodiments, the present disclosure also describes an example article for wireless communication by a wireless communication management module. The example article may include a non-transitory signal bearing medium comprising machine-readable instructions stored thereon, which, when executed by one or more processors, operatively enable a node of a wireless network to operate as described herein. The example article may include instructions which, when executed, may receive uplink information on a first frequency channel from one or more Frequency Domain Duplex (FDD) User Equipments (UEs). The example article may further include instructions which, when executed, may receive uplink information on a second frequency channel during uplink portions of Time Division Duplexing (TDD) frame periods of the second frequency channel from one or more TDD UEs, wherein the second frequency channel is the same frequency channel as the frequency channel on which the one or more FDD UEs are configured to receive downlink transmissions. The example article may further include instructions which, when executed, may control transmission of downlink information to the one or more FDD UEs on the second frequency channel to occur only during downlink portions of TDD frame periods.

The foregoing summary may be illustrative only and may not be intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings:

FIG. 6 illustrates an example computer program product; and

DETAILED DESCRIPTION

Figure 1:
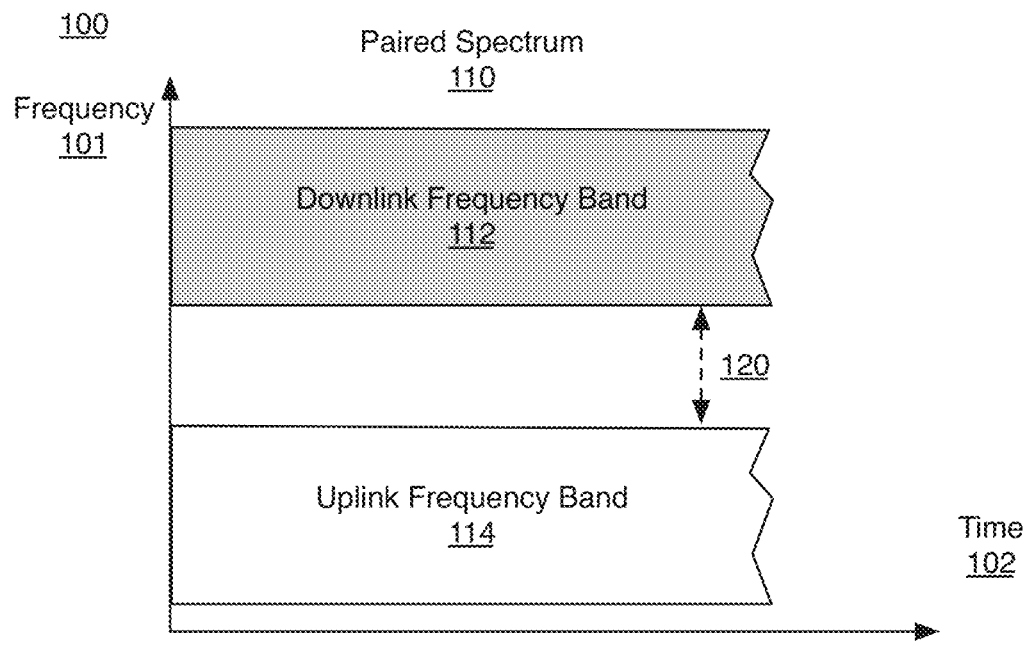
FIG. 1 illustrates representations of frequency channels in the time and frequency domain of an example system for wireless communications using a Frequency Division Duplexing (FDD) scheme.

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, systems and computer-readable media related to wireless communications using a hybrid FDD/TDD scheme.

A wireless network may be comprised of one or more base stations that may collectively provide wireless data communications services to a plurality of User Equipments (UEs) in a geographical region. In general, a UE may be a communication device used by an end user, such as a mobile phone or the like. In general, providing wireless data communications services may include facilitating wireless communications by facilitating the transmission and reception of one or more wireless communications. In general, a wireless communication may include information transmitted wirelessly, which may include user data, voice data, and/or control data. In general, a wireless communication may be directional and may be identified as, for example, "a downlink information" (information transmitted by one or more base stations for reception by one or more UEs) and/or "an uplink information" (information transmitted by one or more UEs for reception by one or more base stations), as appropriate.

In general, wireless data communications may be "full duplex" (i.e., supporting bidirectional communication). Full duplex operation may be achieved by Frequency Domain Duplexing (FDD) or Time Domain Duplexing (TDD), including techniques disclosed herein. A hybrid FDD/TDD system may be configured to support full duplex operation, as further described herein.

In general, FDD UEs are UEs configured for FDD operation. In general, TDD UEs are UEs configured for TDD operation.

In many cases, TDD may offer better spectral efficiency than FDD, due at least in part to TDD's ability to adapt to asymmetrical levels of information that need to be carried on the uplink and downlink, as described herein. FDD, on the other hand, offers certain other benefits such as lower latency, reduced or eliminated need for transmit and receive data buffering, and no loss of spectrum efficiency due to a requirement for guard times between transmit and receive time periods.

In accordance with some examples disclosed herein, hybrid FDD/TDD may be employed to utilize both FDD and TDD as means for duplexing on common frequency bands. In some examples, hybrid FDD/TDD systems may provide improved spectrum efficiency and capacity compared to FDD systems of comparable spectrum occupancy while still providing communications service to FDD UEs as well as to TDD UEs.

In some examples, digital wireless networks are communications networks such as, for example, cellular networks. In some cases these networks and the UEs that operate on them must be compliant with certain industry standards to ensure proper interoperation between the wireless network and the UEs. In some examples, these interoperation standards include definitions of different operational requirements for FDD operation and for TDD operation. In particular, these interoperation standards may define certain frequency bands to be used for FDD operation and other frequency bands to be used for TDD operation. Current versions of these interoperation standards may not provide standards for hybrid FDD/TDD operation.

In some examples, a wireless network operator may have been allocated, by a government authority, one or more spectrum bands which are designated by one or more industry interoperation standards for FDD operation. In some cases such a network operator may have deployed one or more FDD networks on this allocated spectrum which provide service to a significant number of users equipped with compatible FDD UEs. In some cases such a network operator may determine that the spectral efficiency and capacity of one or more of the wireless networks would be enhanced by conversion to hybrid FDD/TDD operation. In doing so, however, it is highly desirable that the "legacy" FDD UEs currently in use by users of the FDD wireless network or networks not be rendered inoperative. It therefore follows that it is highly desirable to convert one or more of the existing FDD networks to a hybrid FDD/TDD network that is "backwards compatible" with the "legacy" FDD UEs.

In some examples, a wireless network operator may be allocated by a government authority one or more spectrum bands which are designated by one or more industry interoperation standards for FDD operation. In some cases the widespread availability of compatible FDD UEs may strongly influence such a network operator to plan to deploy a network that can provide service to these compatible FDD UEs, as opposed to some other kind of UE, for example TDD UEs, which either are not commercially available or which are not configured to operate on the allocated spectrum. In some cases such a network operator may determine that the spectral efficiency and capacity of one or more of the planned wireless networks would be enhanced by hybrid FDD/TDD operation. It therefore follows that in such cases it is highly desirable to deploy a hybrid FDD/TDD network that is "backwards compatible" with the widely available "legacy" FDD UEs.

In consideration of the two examples described above, and possibly in other examples, what is needed is a hybrid FDD/TDD system that is backwards compatible with FDD UEs that are compliant with current or previous versions of interoperation standards which do not anticipate hybrid FDD/TDD operation. At least some of the embodiments in the present disclosure may provide at least some of the benefits of hybrid FDD/TDD operation while also providing backwards compatible wireless data communications services to such "legacy" FDD UEs.

FIG. 1 illustrates representations of frequency bands in the time and frequency domain of an example system 100 for wireless communications using a Frequency Division Duplexing (FDD) scheme, arranged in accordance with at least some industry Interoperation standards. As shown, system 100 may include paired spectrum bands 110, comprising a downlink frequency band 112 and an uplink frequency band 114, separated by a guard band 120. The downlink frequency band 112, uplink frequency band 114, and guard band 120 are represented in the frequency domain by frequency axis 101 and in the time domain by time axis 102.

In general, the FDD scheme as represented by system 100 may be performed by any type of wireless communications system. In an exemplary case, the system 100 may operate in accordance with one of several industry standards for FDD cellular networks that govern "air interface" interoperation between base stations and FDD UEs. As is well known to those familiar with the art, these industry standards may include "GSM," "CDMA," "W-CDMA," "UMTS," "Wi-MAX," and "LTE." In accordance with such a standard, base stations transmit on one or more downlink frequency channels that reside within the downlink frequency band 112 and receive on one or more uplink frequency channels that reside within the uplink frequency band 114. Correspondingly, and also in accordance with such an interoperation standard, base stations receive on one or more downlink frequency channels that reside within the downlink frequency band 112 and transmit on one or more uplink frequency channels that reside within the uplink frequency band 114. For reasons well known to those familiar with the art, guard band 120 between downlink frequency band 112 and uplink frequency band 114 makes it practical for base stations and FDD UEs operating in accordance with system 100 to simultaneously transmit and receive without the need for filters or other means of excessive complexity and cost.

In some examples, the FDD scheme as represented by system 100 may be executed or controlled by a wireless communication management module at a base station. In some examples, the FDD scheme may be executed or controlled by a wireless communication management module at a UE.

In general, as used herein "frequency channel" refers to a portion of radio frequency (RF) spectrum designated for transmission of information between radio base station and UEs. The term "frequency channel" does not imply any format, modulation, coding, or segmentation of that portion of the RF spectrum, although a particular interoperation standard may prescribe one or more of such characteristics to a designated frequency channel.

Paired spectrum 110 may be allocated according to government policy or other functionality that prescribes policies of spectrum utilization. In some cases, by virtue of its inclusion of two frequency bands separated by a guard band, such an allocation may be made in anticipation of its use for FDD wireless networks. In some cases industry interoperation standards take into consideration existing or anticipated paired spectrum allocations by defining FDD operation for them. In some cases interoperation standards for FDD wireless systems may define one or more downlink frequency channels within the downlink frequency band and one or more uplink frequency channels within the uplink frequency band. In some cases there is a one-to-one correspondence between paired frequency channels in the uplink and downlink frequency bands, and in some cases the frequency separation between such paired frequency channels is a constant. In other cases there may be no correspondence between uplink frequency channels and downlink frequency channels.

In some cases the operation of FDD UEs operating in accordance with system 100 will be prescribed by one or more interoperation standards. In some cases such prescribed operation will include operation of the UE in the frequency domain 101 and in the time domain 102. For example, interoperation standards may allow or require an "idle" UE to continuously or intermittently receive a downlink control channel so as to receive information transmitted to it by one or more serving base stations. In another example, interoperation standards may allow or require a UE to transmit on a particular uplink access channel as part of a call initiation process or other function. In this example, in some cases the UE may be allowed or required to make such access channel transmissions within one or more of a sequence of prescribed periods in the time domain 102, and in other cases the UE may be allowed or required to make such access channel transmissions at any time.

The above-cited example of FDD EU transmission on an uplink access channel may be considered to be one of a class of UE uplink transmissions that are "autonomous." Autonomous FDD UE transmissions are those which may be made on one or more uplink frequency channels in at least one of the following two organizations with respect to time domain 102: (a) at any time; and (b) within one or more of a prescribed sequence of time periods, but not limited to any particular one or more of such a sequence of time periods. Thus, from the perspective of one or more base stations receiving autonomous transmissions from FDD UEs, such autonomous transmissions may occur, respectively: (a) at any time; or (b) within any of the prescribed sequence of time periods.

As is well understood by those familiar with the art, operation of FDD UEs in accordance with one or more interoperation standards may be controlled in part by downlink control messages transmitted by one or more base stations. In some cases such downlink control messages may include messages which are transmitted to, and are intended to control, a particular UE. In other cases such downlink control messages may include messages which are transmitted to, and are intended to control, either a plurality of UEs or all UEs that receive them. In some cases, downlink control messages may control one or a plurality of FDD UEs with respect to their operation in the frequency domain 101 and in the timer domain 102. In some cases one or more downlink control messages, commonly called channel assignment messages, may instruct one or more FDD UEs to transmit on a particular uplink frequency channel within the uplink frequency band 114 and/or to receive on a particular downlink channel within the downlink frequency band 112. In some cases one or more downlink control messages may instruct one or more FDD UEs to transmit and/or receive only during one or more specific time periods in the time domain 102.

As is also well understood by those familiar with the art, operation of FDD UEs in some examples may be modified in at least some respects by changing or reprogramming of the software and/or firmware resident within those UEs through a process commonly referred to as "over-the-air programming" (OTAP). In OTAP, new programming, and in some cases instructions for its implementation, are conveyed to one or more UEs, in accordance with one or more interoperation standards, through the serving wireless network. OTAP thus provides a practical means by which large numbers of UEs already "in the field" can be reprogrammed without a requirement that they individually be physically brought or remotely connected to a reprogramming system.

In some examples, OTAP may be useful for making UEs recognize and properly respond to newly defined downlink control messages. However, in some examples certain operational characteristics of UEs may not be changeable using OTAP. In some examples UE characteristics that cannot be changed using OTAP may include frequency bands on which they can operate. In some examples OTAP may not be usable to enable an FDD UE to operate as a TDD UE.

FDD system 100 may provide for communication of information in both the uplink and downlink. In some cases, network traffic may be asymmetric, meaning that the amount of traffic in the downlink is greater than the amount of traffic in the uplink, or vice versa. In some cases this asymmetry may be of a magnitude such that, for example, the downlink frequency band 112 may be overloaded, resulting in poor service quality, while the uplink frequency band has unutilized capacity. In some examples, it may be desirable to account for an asymmetry in network traffic, for example by allocating/providing more bandwidth in the downlink direction than in the uplink direction (or vice versa). In some examples, the system 100 including allocated FDD frequency bands 110 may have a bandwidth asymmetry that may be fixed at any ratio, and/or may be adjustable to any ratio. However, because the allocated FDD frequency bands may be fixed by government regulations and/or by industry interoperation standards, in some examples it may not be possible to adjust the bandwidth asymmetry.

Figure 2:
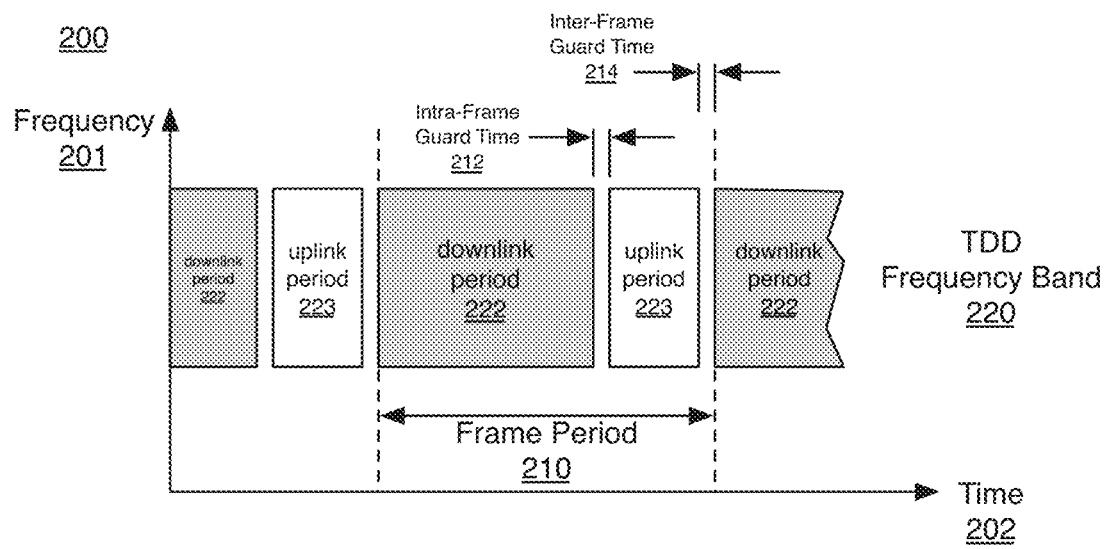
FIG. 2 illustrates representations of frequency channels in the time and frequency domain of an example system for wireless communications using a Time Division Duplexing (TDD) scheme.

FIG. 2 illustrates representations of a frequency band of an example system 200 for wireless communications using a Time Division Duplexing (TDD) scheme, arranged in accordance with at least some industry Interoperation standards. As shown, system 200 may include a single TDD frequency band 220. TDD frequency band 220 may be comprised of concatenated frame periods 210. Each frame period 210 may include a downlink period 222 and an uplink period 223 separated by an intra-frame guard time 212, and an inter-frame guard time 214. In each frame period 210 the downlink period 222 may precede the uplink period 223 as shown, or their order may be reversed. The inter-frame guard time 214 may be of the same duration as the intra-frame guard time 212 or of a different duration, and may occur at the end of the frame period 210 as shown or at its beginning The frequency band 220 is represented in the frequency domain by frequency axis 201 and in the time domain by time axis 202. In some examples, TDD communication as shown in system 200 may be executed or controlled by a wireless communication management module at a base station. In some examples, TDD communication may be executed or controlled by a wireless communication management module at a UE.

The TDD scheme as shown in system 200 may provide wireless communication using TDD frequency band 220. In an exemplary case, the system 200 may operate in accordance with one of several industry standards for TDD cellular networks that govern "air interface" interoperation between base stations and TDD UEs. As is well known to those familiar with the art, these industry standards may include "CDMA," "W-CDMA," "UMTS," "Wi-MAX," and "LTE."

In general, TDD frequency band 220 may be allocated according to government policy or other functionality that prescribes policies of spectrum utilization. In some cases, by virtue of its absence of two frequency bands separated by a guard band, such an allocation may be made in anticipation of its use for TDD wireless networks rather than for FDD networks. In some cases industry interoperation standards take into consideration existing or anticipated spectrum allocations of this type, that are not suitable for FDD use, by defining TDD operation for them.

In general, downlink period 222 may be used for communication of information transmitted by one or more base stations for reception by one or more TDD UEs. In some examples, downlink period 222 may also be referred to as a forward communication period. In general, uplink period 223 may be used for communication of information transmitted by one or more TDD UEs for reception by one or more base stations. In some examples, uplink period 223 may also be referred to as a reverse communication period. In some examples, a TDD frequency band may comprise one or more frequency channels designated for uplink communications during uplink periods and one or more frequency channels designated for downlink communications during downlink periods.

In some examples, the TDD frequency band 220 may occupy a contiguous block of spectrum or may occupy two or more blocks of spectrum. In some examples the bandwidth occupied by the TDD frequency band, represented by the difference between the lowest and highest frequency therein, is of sufficient narrowness that, for reasons well known to those familiar with the art, base stations and UEs of practical design cannot simultaneously transmit and receive on any frequency channels within that frequency band. The TDD scheme as shown in system 200 may include guard times 212 and 214 to accommodate signal propagation between a base station and its most distant served UE and thus to avoid interference between downlink communication and uplink communication. In some examples, the duration of guard times 212 and/or 214 may be adjusted to avoid interference between downlink communication and uplink communication. In some examples this adjustment is comprised of increasing or decreasing one or both of the downlink period and the uplink period so that the frame period remains constant. In other examples the adjustment may include a change in the frame period.

In some examples the relative durations of downlink period 222 and uplink period 223 may be adjusted, at least in part to accommodate asymmetry between downlink and uplink traffic loading. In some examples this adjustment is comprised of increasing one of the downlink period and the uplink period while decreasing the other by a comparable amount so that the frame period remains constant. In other examples the adjustment may include a change in the frame period.

In some cases the operation of TDD UEs operating in accordance with system 200 will be prescribed by one or more interoperation standards. In some examples, interoperation standards may allow or require a TDD UE to transmit on a particular uplink access channel as part of a call initiation process or other function. In this example, in some cases the UE may be allowed or required to make such access channel transmissions within one or more of a sequence of prescribed periods in the time domain 202 which occur during uplink periods 223, and in other cases the UE may be allowed or required to make such access channel transmissions at any time during uplink periods 223.

The above-cited example of TDD EU transmission on an uplink access channel may be considered to be one of a class of UE uplink transmissions that are "autonomous." Autonomous TDD UE transmissions are those which may be made on one or more uplink frequency channels in at least one of the following two organizations with respect to time domain 202: (a) at any time during one or more uplink periods; and (b) within one or more of a prescribed sequence of time periods (all of which occur during uplink periods), but not limited to any particular one or more of such a sequence of time periods. Thus, from the perspective of one or more base stations receiving autonomous transmissions from TDD UEs, such autonomous transmissions may occur, respectively: (a) at any time during one or more uplink periods; or (b) within any of the prescribed sequence of time periods within uplink periods.

As is well understood by those familiar with the art, operation of TDD UEs in accordance with one or more interoperation standards may be controlled in part by downlink control messages transmitted by one or more base stations. In some cases such downlink control messages may include messages which are transmitted to, and are intended to control, a particular UE. In other cases such downlink control messages may include messages which are transmitted to, and are intended to control, either a plurality of UEs or all UEs that receive them. In some cases, downlink control messages may control one or a plurality of TDD UEs with respect to their operation in the frequency domain 201 and in the time domain 202. In some cases one or more downlink control messages, commonly called channel assignment messages, may instruct one or more TDD UEs to transmit on a particular uplink frequency channel within the uplink period 223 and/or to receive on a particular downlink channel within the downlink period 222. In some cases one or more downlink control messages may instruct one or more TDD UEs to transmit and/or receive during one or more specific time periods in the time domain 202. In some cases one or more downlink control messages may inform one or more TDD UEs as to durations of one or more of frame period, downlink period, uplink period, intra-frame guard time, and inter-frame guard time.

Figure 3:
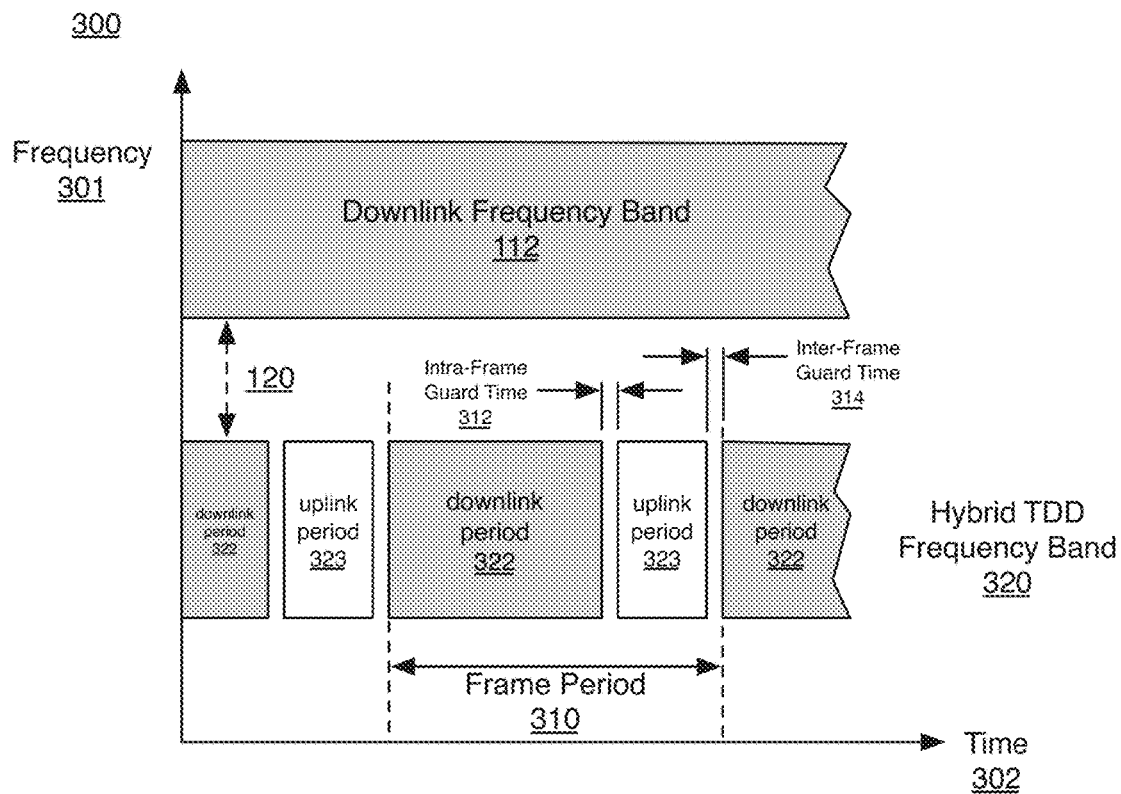
FIG. 3 illustrates representations of frequency channels in the time and frequency domain of an example system for wireless communications using a hybrid FDD/TDD scheme.

FIG. 3 illustrates representations of frequency bands in the time and frequency domain of an example system 300 for wireless communications using a hybrid FDD/TDD scheme providing enhanced downlink capacity, arranged in accordance with at least some embodiments of the present disclosure. As shown, system 300 may include downlink frequency band 112, hybrid TDD frequency band 320, and guard band 120. The downlink frequency band 112, hybrid TDD frequency band 320, and guard band 120 are represented in the frequency domain by frequency axis 301 and in the time domain by time axis 302.

Hybrid TDD frequency band 320 may be comprised of concatenated frame periods 310. Each frame period 310 may include a downlink period 322 and an uplink period 323 separated by an intra-frame guard time 312, and an inter-frame guard time 314. Frame period 310, downlink period 322, uplink period 323, intra-frame guard time 312, and inter-frame guard time 314 have generally the same function and characteristics as their counterparts in TDD frequency band 220 as depicted in FIG. 2 and herein described with respect thereto.

In some examples, a hybrid FDD/TDD system comprising the frequency bands of system 300 can provide communications services to both FDD UEs and TDD UEs. In some examples, FDD UEs so served will receive downlink information on frequency channels within the downlink frequency band 112, and TDD UEs so served will receive downlink information within downlink periods on frequency channels within the hybrid TDD frequency band 320. In some examples Both FDD UEs and TDD UEs will transmit uplink information within uplink periods on frequency channels within the hybrid TDD frequency band 320.

In some examples of system 300 as arranged in accordance with at least some embodiments of the present disclosure, downlink frequency band 112 occupies the same spectrum, and operates in essentially the same manner, as the downlink frequency band of a system heretofore operating as an FDD system as shown in FIG. 1. In some examples, the downlink frequency band 112 of system 300 may operate in accordance with relevant portions of one or more current interoperation standards for FDD networks except for certain additional requirements. In some examples, these additional requirements may include a requirement for modification of existing standardized control protocols, or promulgation of new standardized control protocols. In some examples, these modified or new control protocols control operation of FDD UEs operating on the hybrid FDD/TDD network so that their uplink transmissions are compatible with operation on the hybrid TDD frequency band 320 as described herein. Processes by which existing control protocols can be modified and/or new control protocols can be promulgated are well known to those familiar with the art.

In some examples of system 300 as arranged in accordance with at least some embodiments of the present disclosure, hybrid TDD frequency band 320 occupies the same spectrum as the uplink frequency band 114 of a system heretofore operating as an FDD system as shown in FIG. 1. In some examples of system 300 as arranged in accordance with at least some embodiments of the present disclosure, hybrid TDD frequency band 320 may operate essentially in accordance with relevant portions of one or more current interoperation standards for TDD networks except that it may occupy spectrum that is not designated for TDD operation. In other examples hybrid TDD frequency band 320 may operate in accordance with relevant portions of new interoperation standards for hybrid FDD/TDD networks.

In some examples, a "legacy" FDD UE may operate on a hybrid FDD/TDD network in accordance with system 300 so long as (a) the FDD UE's uplink transmissions are controlled so as to occur only during uplink periods of the hybrid TDD frequency band 320 and (b) uplink operation of the UE is otherwise compatible with requirements of interoperation standards for hybrid FDD/TDD networks. In some examples hybrid FDD/TDD interoperation standards can advantageously be drawn to promote such backwards compatibility with legacy FDD UEs by defining hybrid TDD frequency band organization and operation as closely as possible to the FDD uplink frequency band as defined by one or more current interoperation standards for FDD networks.

In some examples, a "legacy" FDD UE may be reconfigured to enable its operation on a hybrid FDD/TDD network in accordance with system 300 by reprogramming its firmware and/or software. In some examples this reprogramming may include implementation of changes or additions to one or more processes whereby the UE recognizes when it is operating in a hybrid FDD/TD network and thereupon configures its uplink operation so as to be compatible with operation on the hybrid TDD frequency band 320. In some examples this uplink operation configuration may include execution of autonomous transmissions such that they are in the form of TDD UE autonomous transmissions in compliance with one or more interoperation standards for hybrid FDD/TDD networks. In some examples the reprogramming of FDD UE firmware and/or software may enable the UE to recognize and properly respond to modified or new downlink control message protocols in compliance with one or more interoperation standards for hybrid FDD/ TDD networks. In some examples the reprogramming of FDD UE firmware and/or software may be accomplished using OTAP.

In some examples, added downlink capacity enabled by reconfiguring an FDD network to a hybrid FDD/TDD network cam be exploited by introduction of TDD UEs, either as replacements for some of the legacy FDD UEs heretofore operating on the network, to equip new users, or a combination of both. In some examples the configuration and operation of the hybrid TDD frequency band 320 will be essentially in conformance with one or more existing interoperation standards for TDD networks except that it may occupy spectrum that is not designated for TDD network operation. In some of such cases the introduced TDD UEs may include those that are compliant with one or more existing interoperation standards for TDD networks, possibly after being reprogrammed to operate on TDD frequency band 320. In other examples the configuration and operation of the hybrid frequency band 320 will not be in conformance with one or more existing interoperation standards for TDD networks. In some of such cases the introduced TDD UEs may have to be of new design compliant with one or more interoperation standards for hybrid FDD/TDD networks.

In some examples, the spectral efficiency and capacity of hybrid FDD/FDD networks may be optimized by adjusting the relative durations of downlink periods 222 and uplink periods 223 so as to accommodate the relative levels of downlink and uplink traffic loads on the hybrid TDD frequency band 320. In some examples spectral efficiency and capacity may also be optimized by adjusting the mix of FDD UEs and TD UEs deployed for operation on the network. In some examples some of the UEs served by the network may be capable of changing configuration between FDD and TDD operation according to control instructions received from one or more base stations, in some of which cases spectral efficiency and capacity of the network may be optimized by controlling the configurations of some or all such UEs.

As shown in FIG. 3, system 300 includes the frequency band organization of a Hybrid TDD/FDD system that is configured to accommodate asymmetrical loading between the uplink and downlink wherein the downlink is more heavily loaded than the uplink. This is currently the most common case in wireless networks used primarily for data communications. However, it will be appreciated by those familiar with the art that some wireless networks may carry more traffic in the uplink than in the downlink, in which case a hybrid FDD/TDD network might advantageously include an uplink frequency band, rather than a downlink frequency band, in addition to the hybrid TDD band 320. From the hybrid FDD/TDD scheme shown in FIG. 3 and herein described, those familiar with the art will readily understand the configuration, operation, and potential backwards compatibility with legacy FDD UEs of a hybrid FDD/TDD scheme that includes an uplink frequency band rather than a downlink frequency band.

In some examples, the hybrid FDD/TDD scheme may be executed or controlled by a wireless communication management module at a base station. In some examples, the hybrid FDD/TDD scheme may be executed or controlled by a wireless communication management module at a UE.

In some examples, a hybrid TDD frequency band 320 may be created by reconfiguration of the FDD uplink frequency band 114 of a network formerly configured in accordance with one or more interoperation standards for FDD networks. In some examples, such reconfiguration of an FDD network to a hybrid FDD/TDD network may promote spectrum efficiency and/or enhance network capacity by repurposing heretofore underutilized uplink spectrum to provide downlink capacity. In some examples these improvements are rendered more practical and cost-effective by allowing legacy FDD UEs to continue to operate in the resulting hybrid FDD/TDD scheme.

Figure 4:
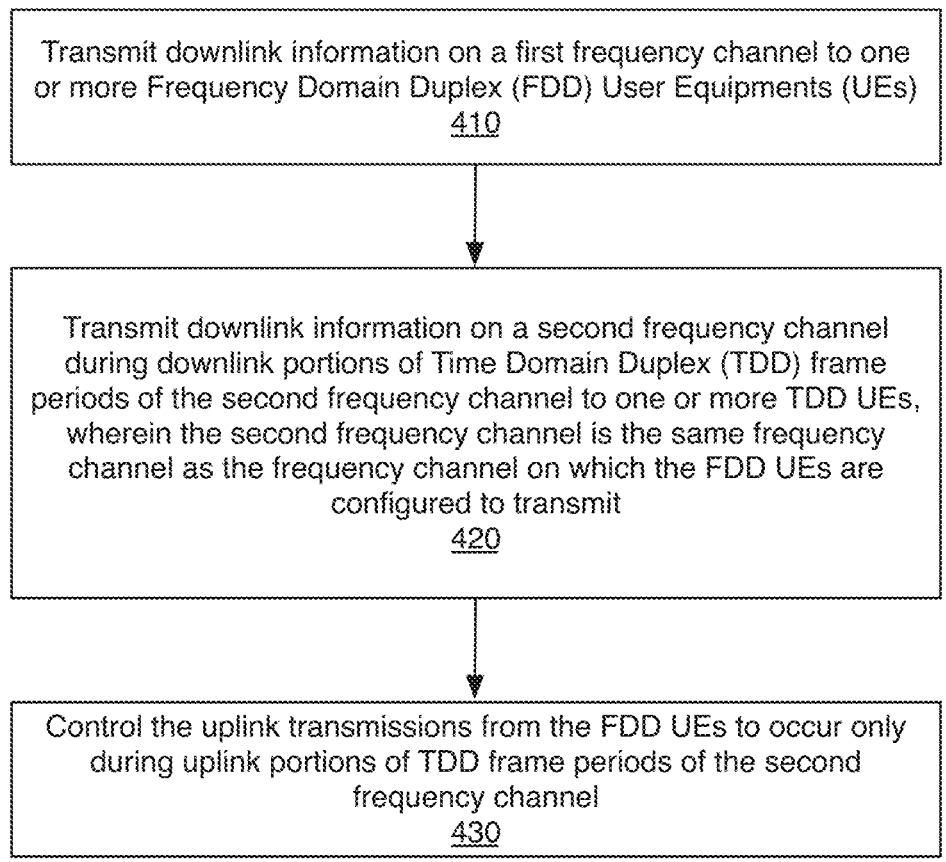
FIG. 4 illustrates a flow diagram of an example method for wireless communication by a wireless communication management module.

FIG. 4 illustrates a flow diagram of an example method 400 for wireless communication, arranged in accordance with at least some embodiments of the present disclosure. In general, method 400 may be performed by any suitable device, devices, or systems such as those discussed herein. In some examples, a base station may perform method 400. In some examples, a UE may perform method 400. In some examples, a wireless communication management module may perform method 400.

Method 400 sets forth various functional blocks or actions that may be described as processing steps, functional operations, events and/or acts, etc., which may be performed by hardware, software, and/or firmware. Numerous alternatives to the functional blocks shown in FIG. 4 may be practiced in various implementations. For example, intervening actions not shown and/or additional actions not shown may be employed and/or some of the actions shown may be eliminated, without departing from the scope of claimed subject matter. In some examples, the actions shown in one figure may be operated using techniques discussed with respect to another figure. Additionally, in some examples, the actions shown in these figures may be operated using parallel processing techniques. The above described, and others not described, rearrangements, substitutions, changes, modifications, etc., may be made without departing from the scope of claimed subject matter. Method 400 may include one or more of functional operations as indicated by one or more of blocks 410, 420, and/or 430. The process of method 400 may begin at block 410.

At block 410, "Transmit downlink information on a first frequency channel to one or more Frequency Domain Duplex (FDD) User Equipments (UEs)", downlink information may be transmitted on a first frequency channel to one or more FDD UEs. In general, the downlink information may be transmitted to FDD UEs using any suitable technique or techniques.

In general, an FDD UE of the one or more FDD UEs may be a legacy communication device or a device compatible with hybrid FDD/TDD communication. As described herein, some legacy communication devices may not be capable of transmitting and/or receiving TDD communications.

Process of method 400 may continue from block 410 to block 420.

At block 420, "Transmit downlink information on a second frequency channel during downlink portions of Time Domain Duplex (TDD) frame periods of the second frequency channel to one or more TDD UEs, wherein the second frequency channel is the same frequency channel as the frequency channel on which the FDD UEs are configured to transmit", downlink information may be transmitted on a second frequency channel during downlink portions of TDD frame periods of the second frequency channel to one or more TDD UEs. The second frequency channel may be the same frequency channel as the frequency channel on which the FDD UEs are configured to transmit. In general, the downlink information may be transmitted using any suitable technique or techniques. In general, the first frequency channel may reside within a first frequency band and the second frequency channel may reside within a second frequency band, wherein the second frequency band may be separated from the first frequency band by a guard band. In some examples, the second frequency channel may comprise concatenated TDD frame periods, each having a downlink period for downlink communication and an uplink period for uplink communication. In general, the downlink period and uplink period may be separated by an intra-frame guard time and/or an inter-frame guard time. Process of method 400 may continue from block 420 to block 430.

At block 430, "Control the uplink transmissions from the FDD UEs to occur only during uplink portions of TDD frame periods of the second frequency channel", uplink transmissions originating from the FDD UEs may be controlled to occur only during uplink portions of TDD frame periods of the second frequency channel. Process of method 400 may stop after block 430.

Figure 5:
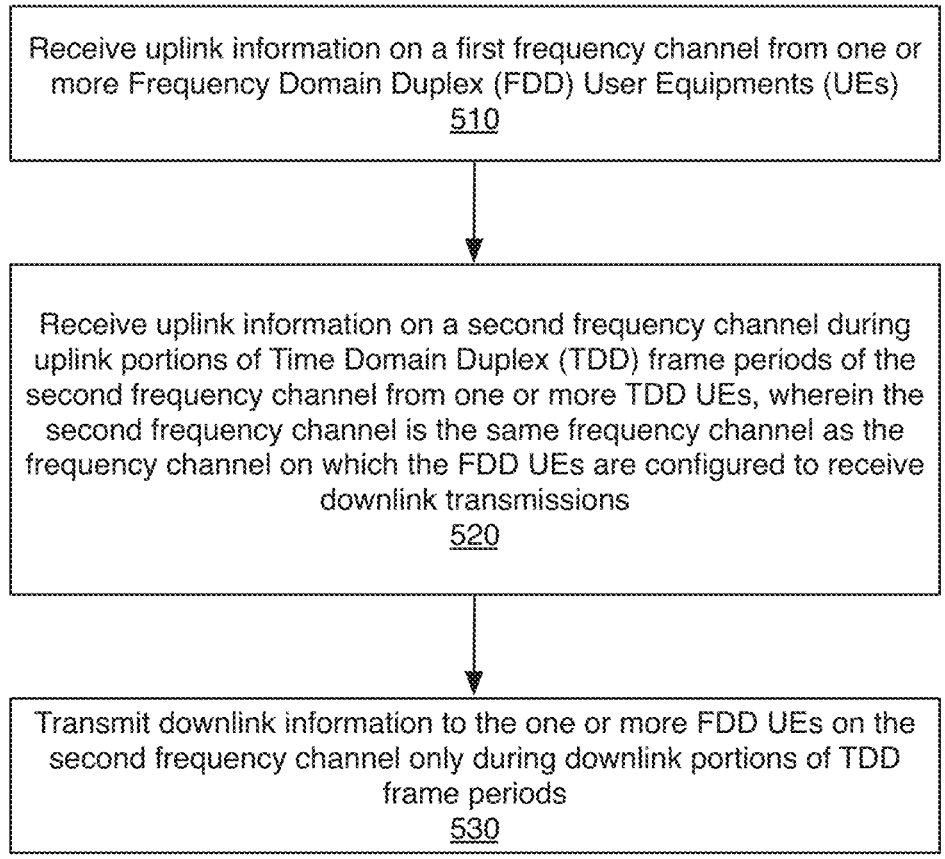
FIG. 5 illustrates a flow diagram of an example method for wireless communication by a wireless communication management module.

FIG. 5 illustrates a flow diagram of an example method 500 for wireless communication, arranged in accordance with at least some embodiments of the present disclosure. In general, method 500 may be performed by any suitable device, devices, or systems such as those discussed herein. In some examples, a base station may perform method 500. In some examples, a UE may perform method 500. In some examples, a wireless communication management module may perform method 500.

Method 500 sets forth various functional blocks or actions that may be described as processing steps, functional operations, events and/or acts, etc., which may be performed by hardware, software, and/or firmware. Numerous alternatives to the functional blocks shown in FIG. 5 may be practiced in various implementations. For example, intervening actions not shown and/or additional actions not shown may be employed and/or some of the actions shown may be eliminated, without departing from the scope of claimed subject matter. In some examples, the actions shown in one figure may be operated using techniques discussed with respect to another figure. Additionally, in some examples, the actions shown in these figures may be operated using parallel processing techniques. The above described, and others not described, rearrangements, substitutions, changes, modifications, etc., may be made without departing from the scope of claimed subject matter. Method 500 may include one or more of functional operations as indicated by one or more of blocks 510, 520, and/or 530. The process of method 500 may begin at block 510.

At block 510, "Receive uplink information on a first frequency channel from one or more Frequency Domain Duplex (FDD) User Equipments (UEs)", uplink information may be received on a first frequency channel from one or more FDD UEs. In general, the uplink information may be transmitted from FDD UEs using any suitable technique or techniques.

In general, an FDD UE of the one or more FDD UEs may be a legacy communication device or a device compatible with hybrid FDD/TDD communication. As described herein, some legacy communication devices may not be capable of transmitting and/or receiving TDD communications.

Process of method 500 may continue from block 510 to block 520.

At block 520, "Receive uplink information on a second frequency channel during uplink portions of Time Domain Duplex (TDD) frame periods of the second frequency channel from one or more TDD UEs, wherein the second frequency channel is the same frequency channel as the frequency channel on which the FDD UEs are configured to receive downlink transmissions", uplink information may be received on a second frequency channel during uplink portions of TDD frame periods of the second frequency channel from one or more TDD UEs. The second frequency channel may be the same frequency channel as the frequency channel on which the FDD UEs are configured to receive downlink transmissions. In general, the uplink information may be received using any suitable technique or techniques. In general, the first frequency channel may reside within a first frequency band and the second frequency channel may reside within a second frequency band, wherein the second frequency band may be separated from the first frequency band by a guard band. In some examples, the second frequency channel may comprise concatenated TDD frame periods, each having a downlink period for downlink communication and an uplink period for uplink communication. In general, the downlink period and uplink period may be separated by an intra-frame guard time and/or an inter-frame guard time. Process of method 500 may continue from block 520 to block 530.

At block 530, "Transmit downlink information to the one or more FDD UEs on the second frequency channel only during downlink portions of TDD frame periods", downlink transmissions originating from the FDD UEs may be transmitted only during downlink portions of TDD frame periods of the second frequency channel. Process of method 500 may stop after block 530.

FIG. 6 illustrates an example computer program product 600, arranged in accordance with at least some embodiments of the present disclosure. Computer program product 600 may include machine readable non-transitory medium having stored therein instructions that, when executed, cause the machine to manage wireless communications according to the processes and methods discussed herein. Computer program product 600 may include a signal bearing medium 602. Signal bearing medium 602 may include one or more machine-readable instructions 604, which, when executed by one or more processors, may operatively enable a computing device to provide the functionality described herein. Signal bearing medium 602 may include one or more machine-readable instructions 605, which, when executed by one or more processors, may operatively enable a computing device to provide the functionality described herein. In various examples, some or all of the machine-readable instructions may be used by the devices discussed herein.

In some examples, the machine readable instructions 604 may include instructions that, when executed, may operatively enable a wireless communication management module to transmit downlink information on a first frequency channel to one or more Frequency Domain Duplex (FDD) User Equipments (UEs). In general, the downlink information may be transmitted to FDD UEs using any suitable technique or techniques.

In some examples, the machine readable instructions 604 may include instructions that, when executed, may operatively enable a wireless communication management module to transmit downlink information on a second frequency channel during downlink portions of Time Domain Duplex (TDD) frame periods of the second frequency channel to one or more TDD UEs, wherein the second frequency channel is the same frequency channel as the frequency channel on which the FDD UEs are configured to transmit. In general, the downlink information may be transmitted using any suitable technique or techniques. In general, the first frequency channel may reside within a first frequency band and the second frequency channel may reside within a second frequency band, wherein the second frequency band may be separated from the first frequency band by a guard band. In some examples, the second frequency channel may comprise concatenated TDD frame periods, each having a downlink period for downlink communication and an uplink period for uplink communication. In general, the downlink period and uplink period may be separated by an intra-frame guard time and/or an inter-frame guard time.

In some examples, the machine readable instructions 604 may include instructions that, when executed, may operatively enable a wireless communication management module to control the uplink transmissions from the FDD UEs to occur only during uplink portions of TDD frame periods of the second frequency channel.

In some examples, the machine readable instructions 605 may include instructions that, when executed, may operatively enable a wireless communication management module to receive uplink information on a first frequency channel from one or more Frequency Domain Duplex (FDD) User Equipments (UEs). In general, the uplink information may be transmitted from FDD UEs using any suitable technique or techniques.

In some examples, the machine readable instructions 605 may include instructions that, when executed, may operatively enable a wireless communication management module to receive uplink information on a second frequency channel during uplink portions of Time Domain Duplex (TDD) frame periods of the second frequency channel from one or more TDD UEs, wherein the second frequency channel is the same frequency channel as the frequency channel on which the FDD UEs are configured to receive downlink transmissions. In general, the uplink information may be received using any suitable technique or techniques. In general, the first frequency channel may reside within a first frequency band and the second frequency channel may reside within a second frequency band, wherein the second frequency band may be separated from the first frequency band by a guard band. In some examples, the second frequency channel may comprise concatenated TDD frame periods, each having a downlink period for downlink communication and an uplink period for uplink communication. In general, the downlink period and uplink period may be separated by an intra-frame guard time and/or an inter-frame guard time.

In some examples, the machine readable instructions 605 may include instructions that, when executed, may operatively enable a wireless communication management module to transmit downlink information to the one or more FDD UEs on the second frequency channel only during downlink portions of TDD frame periods.

In some implementations, signal bearing medium 602 may encompass a computer-readable medium 606, such as, but not limited to, a hard disk drive, a Compact Disc (CD), a Digital Versatile Disk (DVD), a digital tape, memory, etc. In some implementations, signal bearing medium 602 may encompass a recordable medium 608, such as, but not limited to, memory, read/write (R/W) CDs, R/W DVDs, etc. In some implementations, signal bearing medium 602 may encompass a communications medium 610, such as, but not limited to, a digital and/or an analog communication medium (e.g., a fiber optic cable, a waveguide, a wired communication link, a wireless communication link, etc.). In some examples, signal bearing medium 602 may encompass a machine readable non-transitory medium.

Figure 7:
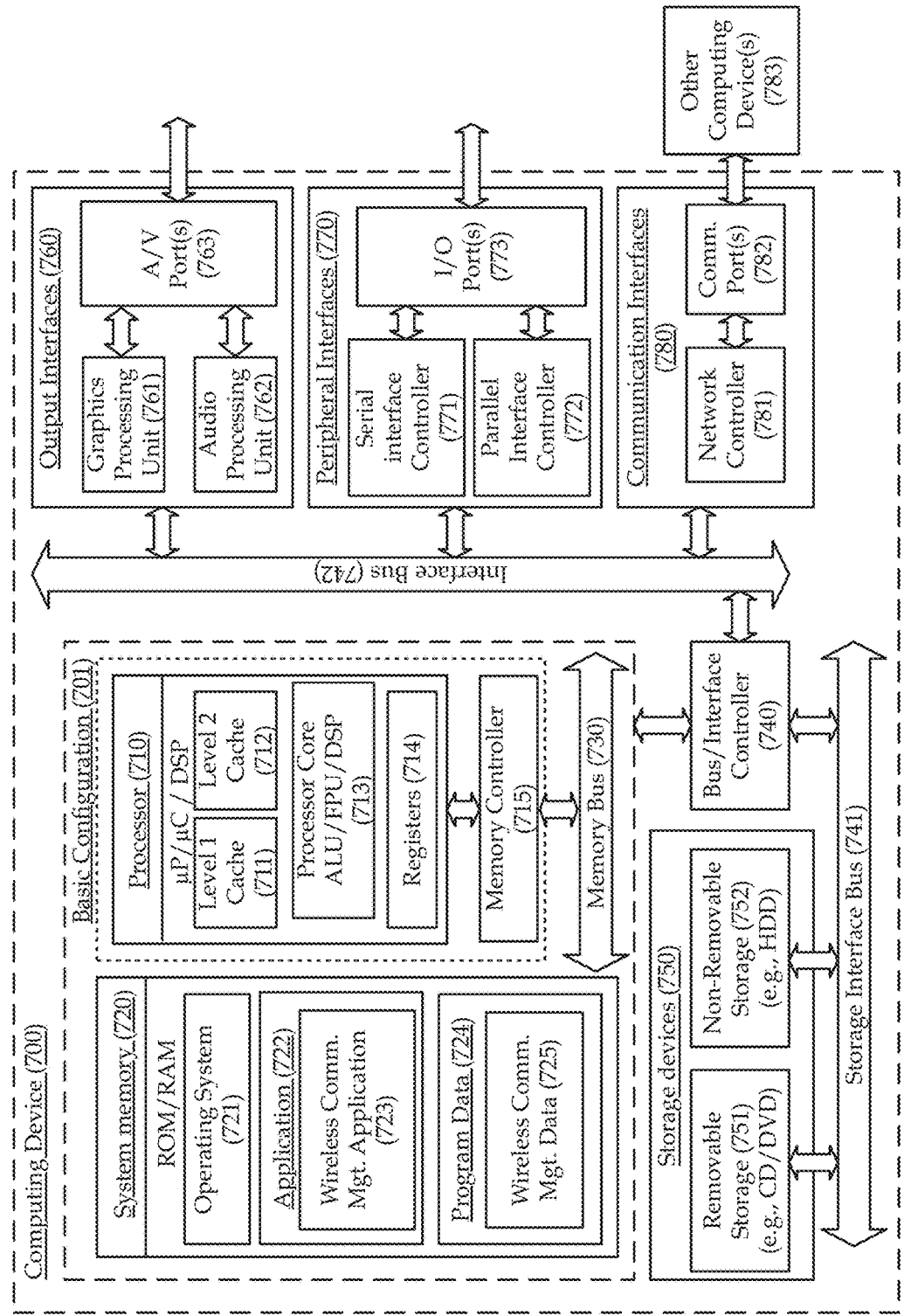
FIG. 7 illustrates of a block diagram of an example computing device, all arranged in accordance with at least some embodiments of the present disclosure.

FIG. 7 is a block diagram illustrating an example computing device 700, arranged in accordance with at least some embodiments of the present disclosure. In various examples, computing device 700 may be configured to manage wireless communications as discussed herein. In one example basic configuration 701, computing device 700 may include one or more processors 710 and system memory 720. A memory bus 730 can be used for communicating between the processor 710 and the system memory 720.

Depending on the desired configuration, processor 710 may be of any type including but not limited to a microprocessor (μP), a microcontroller (μC), a digital signal processor (DSP), or any combination thereof. Processor 710 can include one or more levels of caching, such as a level one cache 711 and a level two cache 712, a processor core 713, and registers 714. The processor core 713 can include an arithmetic logic unit (ALU), a floating point unit (FPU), a digital signal processing core (DSP Core), or any combination thereof. A memory controller 715 can also be used with the processor 710, or in some implementations the memory controller 715 can be an internal part of the processor 710.

Depending on the desired configuration, the system memory 720 may be of any type including but not limited to volatile memory (such as RAM), non-volatile memory (such as ROM, flash memory, etc.) or any combination thereof. System memory 720 may include an operating system 721, one or more applications 722, and program data 724. Application 722 may include wireless communication management application 723 that can be arranged to perform the functions, actions, and/or operations as described herein including the functional blocks, actions, and/or operations described herein. Program Data 724 may include wireless communication management data (725) for use with wireless communication management application 723. In some example embodiments, application 722 may be arranged to operate with program data 724 on an operating system 721. This described basic configuration is illustrated in FIG. 7 by those components within dashed line 701.

Computing device 700 may have additional features or functionality, and additional interfaces to facilitate communications between the basic configuration 701 and any required devices and interfaces. For example, a bus/interface controller 740 may be used to facilitate communications between the basic configuration 701 and one or more data storage devices 750 via a storage interface bus 741. The data storage devices 750 may be removable storage devices 751, non-removable storage devices 752, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 720, removable storage 751 and non-removable storage 752 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 700. Any such computer storage media may be part of device 700.

Computing device 700 may also include an interface bus 742 for facilitating communication from various interface devices (e.g., output interfaces, peripheral interfaces, and communication interfaces) to the basic configuration 701 via the bus/interface controller 740. Example output interfaces 760 may include a graphics processing unit 761 and an audio processing unit 762, which may be configured to communicate to various external devices such as a display or speakers via one or more NV ports 763. Example peripheral interfaces 770 may include a serial interface controller 771 or a parallel interface controller 772, which may be configured to communicate with external devices such as input devices (e.g., keyboard, mouse, pen, voice input device, touch input device, etc.) or other peripheral devices (e.g., printer, scanner, etc.) via one or more I/O ports 773. An example communication interface 780 includes a network controller 781, which may be arranged to facilitate communications with one or more other computing devices 783 over a network communication via one or more communication ports 782. A communication connection is one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

Computing device 700 may be implemented as a portion of a small-form factor portable (or mobile) electronic device such as a cell phone, a mobile phone, a tablet device, a laptop computer, a personal data assistant (PDA), a personal media player device, a wireless web-watch device, a personal headset device, an application specific device, or a hybrid device that includes any of the above functions. Computing device 700 may also be implemented as a personal computer including both laptop computer and non-laptop computer configurations. In addition, computing device 700 may be implemented as part of a wireless base station or other wireless system or device.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing device, that manipulates or transforms data represented as physical electronic or magnetic quantities within memories, registers, or other information storage devices, transmission devices, or display devices of the computing device.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In some embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communication link, a wireless communication link, etc.).

The herein described subject matter sometimes illustrates different components contained within, or connected with, different other components. It is to be understood that such depicted architectures are merely examples and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claimed subject matter containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While certain example techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

What is claimed:

1. A method for wireless communication in a wireless network, the method comprising:
    transmitting first downlink information on a first frequency channel to one or more frequency domain duplex (FDD) user equipments (UEs);
    transmitting second downlink information on a second frequency channel during downlink portions of time domain duplex (TDD) frame periods of the second frequency channel to one or more TDD UEs, wherein the second frequency channel is a frequency channel on which the FDD UEs are configured to transmit uplink transmissions; and
    controlling the uplink transmissions from the FDD UEs to occur only during uplink portions of the TDD frame periods of the second frequency channel, wherein each downlink portion of each TDD frame period of the second frequency channel is separated from an adjacent uplink portion of the second frequency channel by an intra-frame guard time or an inter-frame guard time.

2. The method of claim 1, further comprising:
    prior to transmitting the second downlink information on the second frequency channel, reconfiguring the frequency channel on which the FDD UEs are configured to transmit the uplink transmissions, as the second frequency channel.

3. The method of claim 1, wherein the frequency channel on which the FDD UEs are configured to transmit the uplink transmissions, is a same frequency channel as the second frequency channel, by virtue of adherence to pre-existing interoperation standards.

4. The method of claim 1, further comprising:
    dynamically modifying at least one of a time interval of the TDD frame periods, a time interval of the downlink portions of the TDD frame periods, or a time interval of the uplink portions of the TDD frame periods to provide preferred relative downlink and uplink capacities.

5. A method for wireless communication in a wireless network, the method comprising:
    receiving first uplink information on a first frequency channel from one or more frequency domain duplex (FDD) user equipments (UEs);
    receiving second uplink information on a second frequency channel during uplink portions of time domain duplex (TDD) frame periods of the second frequency channel from one or more TDD UEs, wherein the second frequency channel is a frequency channel on which the FDD UEs are configured to receive downlink transmissions; and
    transmitting downlink information to the one or more FDD UEs on the second frequency channel only during downlink portions of the TDD frame periods, wherein each downlink portion of each TDD frame period of the second frequency channel is separated from an adjacent uplink portion of the second frequency channel by an intra-frame guard time or an inter-frame guard time.

6. The method of claim 5, further comprising:
    prior to receiving the second uplink information on the second frequency channel, reconfiguring the frequency channel on which the FDD UEs are configured to receive the downlink transmissions, as the second frequency channel.

7. The method of claim 5, wherein the frequency channel on which the FDD UEs are configured to receive the downlink transmissions, is a same frequency channel as the second frequency channel, by virtue of adherence to pre-existing interoperation standards.

8. The method of claim 5, further comprising:
    dynamically modifying at least one of a time interval of the TDD frame periods, a time interval of the downlink portions of the TDD frame periods, or a time interval of the uplink portions of the TDD frame periods to provide preferred relative downlink and uplink capacities.

9. An apparatus for wireless communication, the apparatus comprising:
    a transceiver configured to connect to one or more antennas;
    a wireless communication management processor communicatively coupled to the transceiver, wherein the wireless communication management processor comprises a non-transitory signal bearing medium that includes instructions which, in response to execution, cause the wireless communication management processor to:
    transmit first downlink information on a first frequency channel to one or more frequency domain duplex (FDD) user equipments (UEs);
    transmit second downlink information on a second frequency channel during downlink portions of time domain duplex (TDD) frame periods of the second frequency channel to one or more TDD UEs, wherein the second frequency channel is a frequency channel on which the FDD UEs are configured to transmit uplink transmissions; and
    control the uplink transmissions from the FDD UEs to occur only during uplink portions of the TDD frame periods of the second frequency channel, wherein each downlink portion of each TDD frame period is separated from an adjacent uplink portion of the second frequency channel by an intra-frame guard time or an inter-frame guard time; and
    a processor communicatively coupled to the non-transitory signal bearing medium to execute the instructions.

10. The apparatus of claim 9, wherein the instructions, in response to execution, further cause the wireless communication management processor to:
    configure the frequency channel on which the FDD UEs are configured to transmit the uplink transmissions, prior to transmitting the second downlink information on the second frequency channel, as the second frequency channel.

11. The apparatus of claim 9, wherein the frequency channel on which the FDD UEs are configured to transmit the uplink transmissions, is a same frequency channel as the second frequency channel, by virtue of adherence to pre-existing interoperation standards.

12. The apparatus of claim 9, wherein:
    at least one of a time interval of the TDD frame periods, a time interval of the downlink portions of the TDD frame periods, or a time interval of the uplink portions of the TDD frame periods are dynamically modified to provide preferred relative downlink and uplink capacities.

13. An apparatus for wireless communication, the apparatus comprising:
    a transceiver configured to connect to one or more antennas;
    a wireless communication management processor communicatively coupled to the transceiver, wherein the wireless communication management processor comprises a non-transitory signal bearing medium that includes instructions which, in response to execution, cause the wireless communication management processor to:

receive first uplink information on a first frequency channel from one or more frequency domain duplex (FDD) user equipments (UEs);

receive second uplink information on a second frequency channel during uplink portions of time domain duplex (TDD) frame periods of the second frequency channel from one or more TDD UEs, wherein the second frequency channel is a frequency channel on which the FDD UEs are configured to receive downlink transmissions; and transmit downlink information to the one or more FDD UEs on the second frequency channel only during downlink portions of TDD frame periods, wherein each downlink portion of each TDD frame period is separated from an adjacent uplink portion of the second frequency channel by an intra-frame guard time or an inter-frame guard time; and a processor communicatively coupled to the non-transitory signal bearing medium to execute the instructions.

14. The apparatus of claim 13, wherein the instructions, in response to execution, further cause the wireless communication management processor to:

configure the frequency channel on which the FDD UEs are configured to receive the downlink transmissions, prior to receiving the second uplink information on the second frequency channel, as the second frequency channel.

15. The apparatus of claim 13, wherein the frequency channel on which the FDD UEs are configured to receive the downlink transmissions, is a same frequency channel as the second frequency channel, by virtue of adherence to interoperation standards.

16. The apparatus of claim 13, wherein:

at least one of a time interval of the TDD frame periods, a time interval of the downlink portions of the TDD frame periods, or a time interval of the uplink portions of the TDD frame periods are dynamically modified to provide preferred relative downlink and uplink capacities.

17. An article for wireless communication by a wireless communication management processor, the article comprising:

a memory that comprises machine-readable instructions stored thereon, which, in response to execution by one or more processors, operatively enable a node of a wireless network to:

transmit first downlink information on a first frequency channel to one or more frequency domain duplex (FDD) user equipments (UEs);

transmit second downlink information on a second frequency channel during downlink portions of time domain duplex (TDD) frame periods of the second frequency channel to one or more TDD UEs, wherein the second frequency channel is a frequency channel on which the FDD UEs are configured to transmit uplink transmissions; and control the uplink transmissions from the FDD UEs to occur only during uplink portions of the TDD frame periods of the second frequency channel, wherein each downlink portion of each TDD frame period is separated from an adjacent uplink portion of the second frequency channel by an intra-frame guard time or an inter-frame guard time.

18. The article of claim 17, wherein the instructions, in response to execution by the one or more processors, further operatively enable the node to:

configure the frequency channel on which the FDD UEs are configured to transmit the uplink transmissions, prior to transmitting the second downlink information on the second frequency channel, as the second frequency channel.

19. The article of claim 17, wherein the frequency channel on which the FDD UEs are configured to transmit the uplink transmissions, is a same frequency channel as the second frequency channel, by virtue of adherence to pre-existing interoperation standards.

20. The article of claim 17, wherein:

at least one of a time interval of the TDD frame periods, a time interval of the downlink portions of the TDD frame periods, or a time interval of the uplink portions of the TDD frame periods are dynamically modified to provide preferred relative downlink and uplink capacities.

21. An article for wireless communication by a wireless communication management processor, the article comprising:

a memory that comprises machine-readable instructions stored thereon, which in response to execution by one or more processors, operatively enable a node of a wireless network to:

receive first uplink information on a first frequency channel from one or more frequency domain duplex (FDD) user equipments (UEs);

receive second uplink information on a second frequency channel during uplink portions of time domain duplex (TDD) frame periods of the second frequency channel from one or more TDD UEs, wherein the second frequency channel is a frequency channel on which the FDD UEs are configured to receive downlink transmissions; and transmit downlink information to the one or more FDD UEs on the second frequency channel only during downlink portions of TDD frame periods, wherein each downlink portion of each TDD frame period is separated from an adjacent uplink portion on the second frequency channel by an intra-frame guard time or an inter-frame guard time.

22. The article of claim 21, wherein the instructions, in response to execution by the one or more processors, further operatively enable the node to:

configure the frequency channel on which the FDD UEs are configured to receive the downlink transmissions, prior to receiving the second uplink information on the second frequency channel, as the second frequency channel.

23. The article of claim 21, wherein the frequency channel on which the FDD UEs are configured to receive the downlink transmissions, is a same frequency channel as the second frequency channel, by virtue of adherence to interoperation standards.

24. The article of claim 21, wherein:

at least one of a time interval of the TDD frame periods, a time interval of the downlink portions of the TDD frame periods, or a time interval of the uplink portions of the TDD frame periods are dynamically modified to provide preferred relative downlink and uplink capacities.

* * * * *

UNITED STATES PATENT AND TRADEMARK OFFICE
CERTIFICATE OF CORRECTION

PATENT NO. : 9,867,168 B2  
APPLICATION NO. : 14/783309  
DATED : January 9, 2018  
INVENTOR(S) : Drucker Page 1 of 2

It is certified that error appears in the above-identified patent and that said Letters Patent is hereby corrected as shown below:

On the Title Page

In item (71), under "Applicant", in Column 1, Lines 1-2, delete "Empire Technology Development LLC, Wilmington (DE)" and insert -- Empire Technology Development LLC, Wilmington, DE (US) --, therefor.

In the Drawings

In Fig. 7, Sheet 6 of 6, for Tag "(771)" Line 2, delete "interface" and insert -- Interface --, therefor.

In the Specification

In Column 3, Line 56, delete "illustrates of a" and insert -- illustrates a --, therefor.

In Column 7, Line 47, delete "timer domain" and insert -- time domain --, therefor.

In Column 8, Line 25, delete "bands 110 may" and insert -- bands may --, therefor.

In Column 8, Line 40, delete "210 the" and insert -- 210, the --, therefor.

In Column 10, Line 65, delete "examples Both" and insert -- examples, both --, therefor.

In Column 12, Line 6, delete "cam be" and insert -- can be --, therefor.

In Column 12, Line 17, delete "on TDD" and insert -- on hybrid TDD --, therefor.

In Column 12, Line 19, delete "hybrid frequency" and insert -- hybrid TDD frequency --, therefor.

In Column 12, Line 50, delete "hybrid TDD band" and insert -- hybrid TDD frequency band --, therefor.

Signed and Sealed this  
Twenty-fourth Day of July, 2018

Andrei Iancu  
*Director of the United States Patent and Trademark Office*

CERTIFICATE OF CORRECTION (continued)
U.S. Pat. No. 9,867,168 B2

In Column 16, Line 50, delete "hard disk drive," and insert -- Hard Disk Drive (HDD), --, therefor.

In Column 17, Line 14, delete "implementations the" and insert -- implementations, the --, therefor.

In Column 17, Line 62, delete "of device" and insert -- of computing device --, therefor.

In Column 18, Line 4, delete "NV ports" and insert -- A/V ports --, therefor.

In Column 19, Line 28, delete "and or" and insert -- and/or --, therefor.

In Column 20, Line 17, delete "recitation no" and insert -- recitation, no --, therefor.

In Column 20, Line 39, delete "general such" and insert -- general, such --, therefor.

In Column 20, Line 47, delete "general such" and insert -- general, such --, therefor.